US007665852B2

(12) United States Patent
Yavid et al.

(10) Patent No.: US 7,665,852 B2
(45) Date of Patent: Feb. 23, 2010

(54) ARRANGEMENT FOR AND METHOD OF PROJECTING AN IMAGE WITH SAFETY CIRCUITRY

(75) Inventors: Dmitriy Yavid, Stony Brook, NY (US); Miklos Stern, Flushing, NY (US); Thomas Mazz, Huntington, NY (US); Costanzo Difazio, East Patchogue, NY (US); Chinh Tan, Setauket, NY (US); Carl Wittenberg, Water Mill, NY (US); Daniel Gonzalez, Setauket, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 573 days.

(21) Appl. No.: 11/446,756

(22) Filed: Jun. 5, 2006

(65) Prior Publication Data
US 2007/0285625 A1 Dec. 13, 2007

(51) Int. Cl.
H01S 3/00 (2006.01)
G03B 21/26 (2006.01)
G03B 21/20 (2006.01)
(52) U.S. Cl. .......................... 353/85; 353/94; 372/38.09
(58) Field of Classification Search ............. 372/38.09, 372/38.02, 24, 29.021, 29.011; 353/30, 31, 353/94, 122, 98; 359/196–226, 305; 348/203, 348/201, 196
See application file for complete search history.

(56) References Cited

U.S. PATENT DOCUMENTS

| 3,575,496 A | 4/1971 | Pollock |
| 4,685,097 A | 8/1987 | van der Put |
| 5,892,219 A * | 4/1999 | Minakuchi et al. .......... 250/205 |
| 6,445,487 B1 | 9/2002 | Roddy et al. |
| 6,670,603 B2 * | 12/2003 | Shimada et al. ............. 250/235 |
| 6,832,724 B2 * | 12/2004 | Yavid et al. ................. 235/454 |
| 6,937,372 B2 * | 8/2005 | Kandori et al. ............. 359/198 |
| 7,006,274 B1 | 2/2006 | Wittenberg et al. |
| 7,110,153 B2 * | 9/2006 | Sakai .......................... 359/212 |
| 7,393,107 B2 * | 7/2008 | Yonekubo et al. ............. 353/29 |
| 2001/0022566 A1 * | 9/2001 | Okazaki ....................... 345/84 |
| 2002/0114057 A1 | 8/2002 | Roddy et al. |
| 2002/0154375 A1 * | 10/2002 | Roddy et al. ................ 359/212 |
| 2003/0011751 A1 | 1/2003 | Sakata et al. |
| 2005/0024704 A1 * | 2/2005 | Sakai .......................... 359/212 |
| 2005/0117132 A1 | 6/2005 | Agostinelli |
| 2005/0140832 A1 * | 6/2005 | Goldman et al. ............ 348/746 |
| 2006/0209264 A1 * | 9/2006 | Yamazaki et al. ............. 353/31 |
| 2007/0279509 A1 * | 12/2007 | Tan et al. ................. 348/333.1 |

FOREIGN PATENT DOCUMENTS

WO 20050046249 5/2005

* cited by examiner

Primary Examiner—William C Dowling
Assistant Examiner—Ryan Howard
(74) Attorney, Agent, or Firm—Kirschstein, et al.

(57) ABSTRACT

Red, blue and green lasers respectively emit a plurality of red, blue and green laser beams having respective output powers. The beams are optically focused and collinearly arranged to form a composite beam which is swept by a pair of scan mirrors in a pattern of scan lines on a projection surface, each scan line having a number of pixels. A controller causes selected pixels to be illuminated, and rendered visible, by the composite beam to produce an image. A safety circuit detects a malfunction of at least one of the lasers and the scan mirrors, and deenergizes the at least one of the lasers and the scan mirrors upon detection of the malfunction.

26 Claims, 10 Drawing Sheets

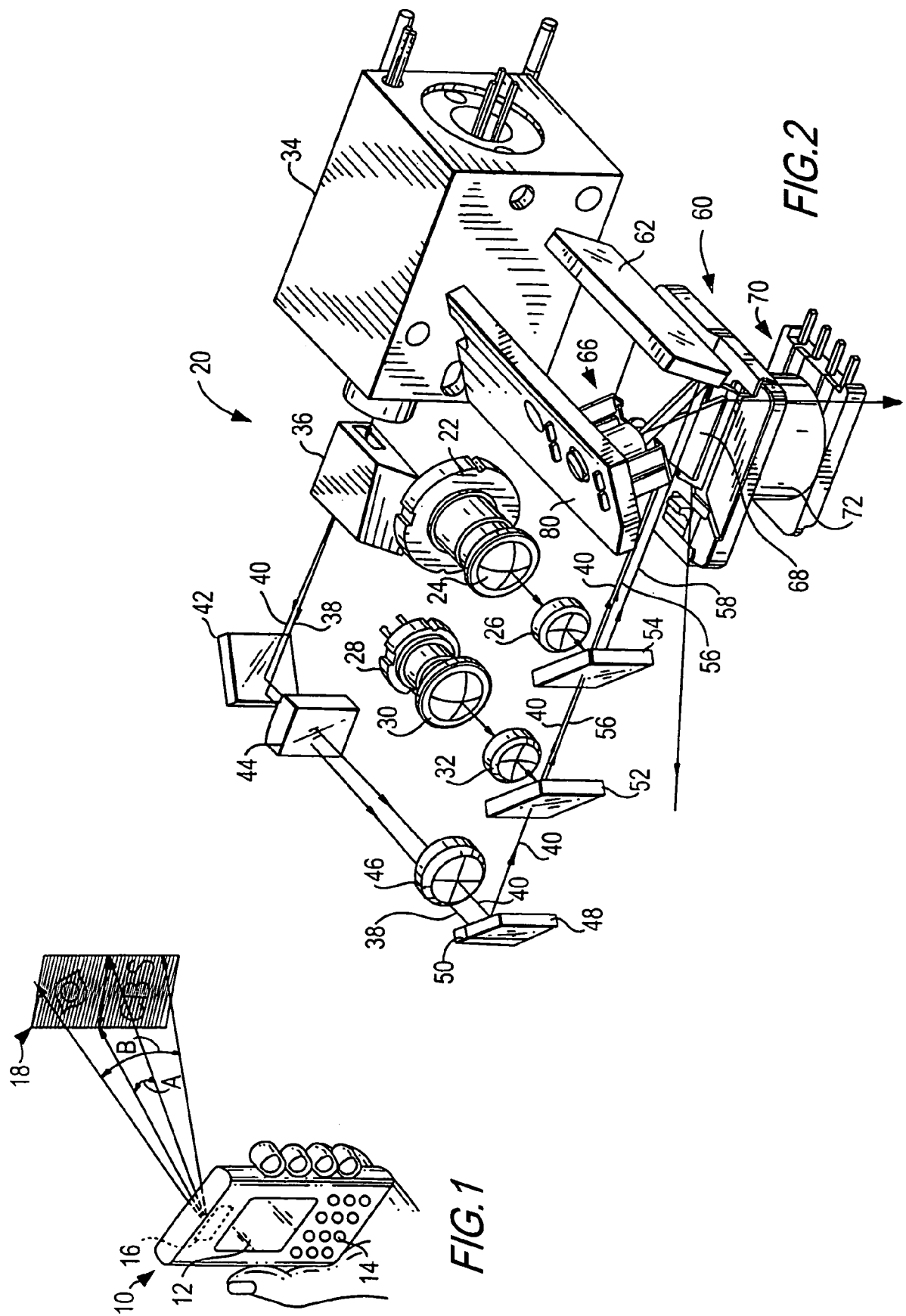

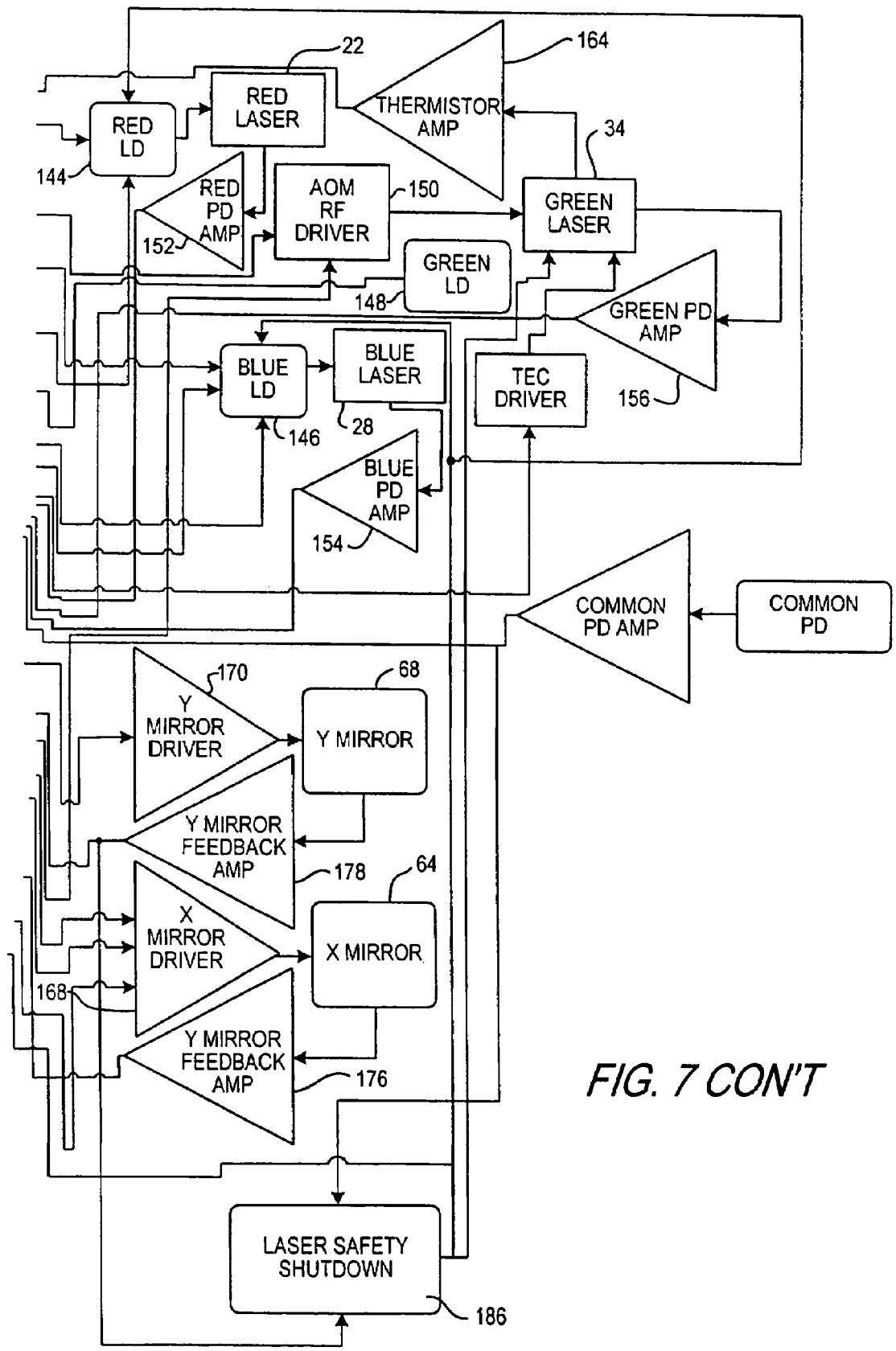
FIG. 7 CON'T

ARRANGEMENT FOR AND METHOD OF PROJECTING AN IMAGE WITH SAFETY CIRCUITRY

BACKGROUND OF THE INVENTION

1. Field of the Invention

The present invention generally relates to projecting a two-dimensional image of high quality, especially in color, using high power lasers and scan mirror drives, without exceeding governmental regulatory exposure limits on laser power, thereby enhancing viewer and bystander safety during image projection.

2. Description of the Related Art

It is generally known to project a two-dimensional image on a projection surface based on a pair of scan mirrors which oscillate by respective mirror drives over scan angles in mutually orthogonal directions to scan a laser beam over a raster pattern comprised of a plurality of scan lines. The image is created in the raster pattern by modulating a laser on and off at selected times, thereby illuminating selected pixels and not illuminating other pixels in each scan line. Color images can be obtained by modulating red, blue and green lasers and illuminating the selected pixels by superimposing one or more of the red, blue and green laser beams emitted by the respective lasers on a respective pixel to obtain a desired color.

The output power of each laser must be monitored for safety. Although the image brightness is enhanced when the output power of each laser is increased, government regulatory safety standards dictate the maximum power output of each laser for human safety. Each of the output powers of the red, blue and green laser beams must therefore be less than a maximum value. Some of these standards require that the output power of each laser does not exceed regulatory limits even when control circuitry that normally regulates the laser output power fails.

For example, an internal monitor photodiode inside the laser housing is normally operative for monitoring the laser output power. The monitor photodiode is part of a feedback circuit for maintaining the laser output power constant during operation. If the monitor photodiode were to fail, or to become electrically disconnected from the feedback circuit, then the feedback signal would be lost, and the feedback circuit would increase the laser output power, possibly to a level exceeding regulatory limits and compromise viewer and bystander safety.

The oscillation of each mirror must also be monitored for safety. For example, the scan angle of each mirror must be greater than a minimum value to insure that the drive for the respective mirror has not malfunctioned or stalled. This would cause the laser beams to dwell in an angular area smaller than the desired scan angle, or even remain stationary, and exceed the output power regulatory limits at that smaller angular area since the output power is more intense.

SUMMARY OF THE INVENTION

Objects of the Invention

Accordingly, it is a general object of this invention to provide an image projection arrangement that projects a two-dimensional image, especially in color, without exceeding safety standards in accordance with the method of this invention.

Another object of this invention is to deenergize at least one laser, and preferably all of the lasers, upon detection of a malfunction in such projection arrangements.

Yet another object of this invention is to deenergize at least one mirror drive, and preferably both of the mirror drives, upon detection of a malfunction in such projection arrangements.

Still another object of this invention is to deenergize at least one, if not all, of the lasers and at least one, if not both, of the mirror drives, upon detection of a total output power from all the lasers that exceeds a preestablished setting in such projection arrangements.

An additional object is to provide a miniature, compact, lightweight, and portable color image projection module useful in many instruments of different form factors.

FEATURES OF THE INVENTION

In keeping with these objects and others, which will become apparent hereinafter, one feature of this invention resides, briefly stated, in an image projection arrangement for, and a method of, projecting a two-dimensional image, especially of high brightness and in color. The arrangement includes an energizable laser assembly for generating a laser beam having an output power when energized; an energizable scanner for sweeping the laser beam as a pattern of scan lines on a projection surface at a distance from the laser assembly, each scan line having a number of pixels; and a controller operatively connected to the laser assembly and the scanner, for causing selected pixels to be illuminated, and rendered visible, by the laser beam to produce the image.

In accordance with one aspect of this invention, a safety circuit is provided for detecting a malfunction of at least one of the laser assembly and the scanner, and for deenergizing the at least one of the laser assembly and the scanner upon detection of the malfunction. In the preferred embodiment, the laser assembly includes a plurality of lasers for respectively generating a plurality of laser beams of different wavelengths, for example, red, blue and green laser beams. The scanner preferably includes a first oscillatable scan mirror operative for sweeping the laser beams along a first direction at a first scan rate and over a first scan angle, and a second oscillatable scan mirror operative for sweeping the laser beams along a second direction substantially perpendicular to the first direction, and at a second scan rate different from the first scan rate, and at a second scan angle different from the first scan angle. The safety circuit is operative for deenergizing at least one of the lasers, and preferably all of the lasers, as well as deenergizing at least one of the mirror drives, and preferably both of the mirror drives, upon detection of the malfunction. In addition, the safety circuit is operative for deenergizing at least one, if not all, of the lasers and at least one, if not both, of the mirror drives, upon detection that a total output power from all the lasers exceeds a preestablished setting. This setting is proportional to the speed of the first scan mirror.

The output power of each laser is preferably monitored by a detector, such as an external photodiode, operative for detecting an output power of each beam. Each of the output powers of the red, blue and green laser beams must be less than a maximum value to avoid deenergizing the lasers. The oscillation of each mirror is preferably monitored by an electromagnetic sense coil that interacts with a permanent magnet jointly oscillated with each mirror to generate a control signal whose frequency matches the drive frequency for the drive for that mirror. The scan angle of each mirror must be greater than a minimum value to insure that the drive for the respective mirror has not malfunctioned or stalled.

The invention further proposes redundant safety circuits, each monitoring a single component, such as one of the lasers or one of the scan mirrors. This redundancy insures that the image projection arrangement will be safe to use especially in consumer applications.

The arrangement further advantageously includes an optical assembly for focusing and nearly collinearly arranging the red beam, the blue beam and the green beam to form a composite beam which is directed to the scanner. At least one of the scan mirrors is oscillated by an inertial drive.

The controller includes means for energizing the laser assembly to illuminate the selected pixels, and for deenergizing the laser assembly to non-illuminate pixels other than the selected pixels.

It is advantageous if a support is provided for supporting the laser assembly, the optical assembly and the scanner. The support, the laser assembly, the scanner, the controller and the optical assembly preferably occupy a volume of about seventy cubic centimeters, thereby constituting a compact module, which is interchangeably mountable in housings of different form factors, including, but not limited to, a pen-shaped, gun-shaped or flashlight-shaped instrument, a personal digital assistant, a pendant, a watch, a computer, and, in short, any shape due to its compact and miniature size. The projected image can be used for advertising or signage purposes, or for a television or computer monitor screen, and, in short, for any purpose desiring something to be displayed.

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 1 is a perspective view of a hand-held instrument projecting an image at a working distance therefrom;

FIG. 2 is an enlarged, overhead, perspective view of an image projection arrangement in accordance with this invention for installation in the instrument of FIG. 1;

DETAILED DESCRIPTION OF THE PREFERRED EMBODIMENTS

Figure 3:
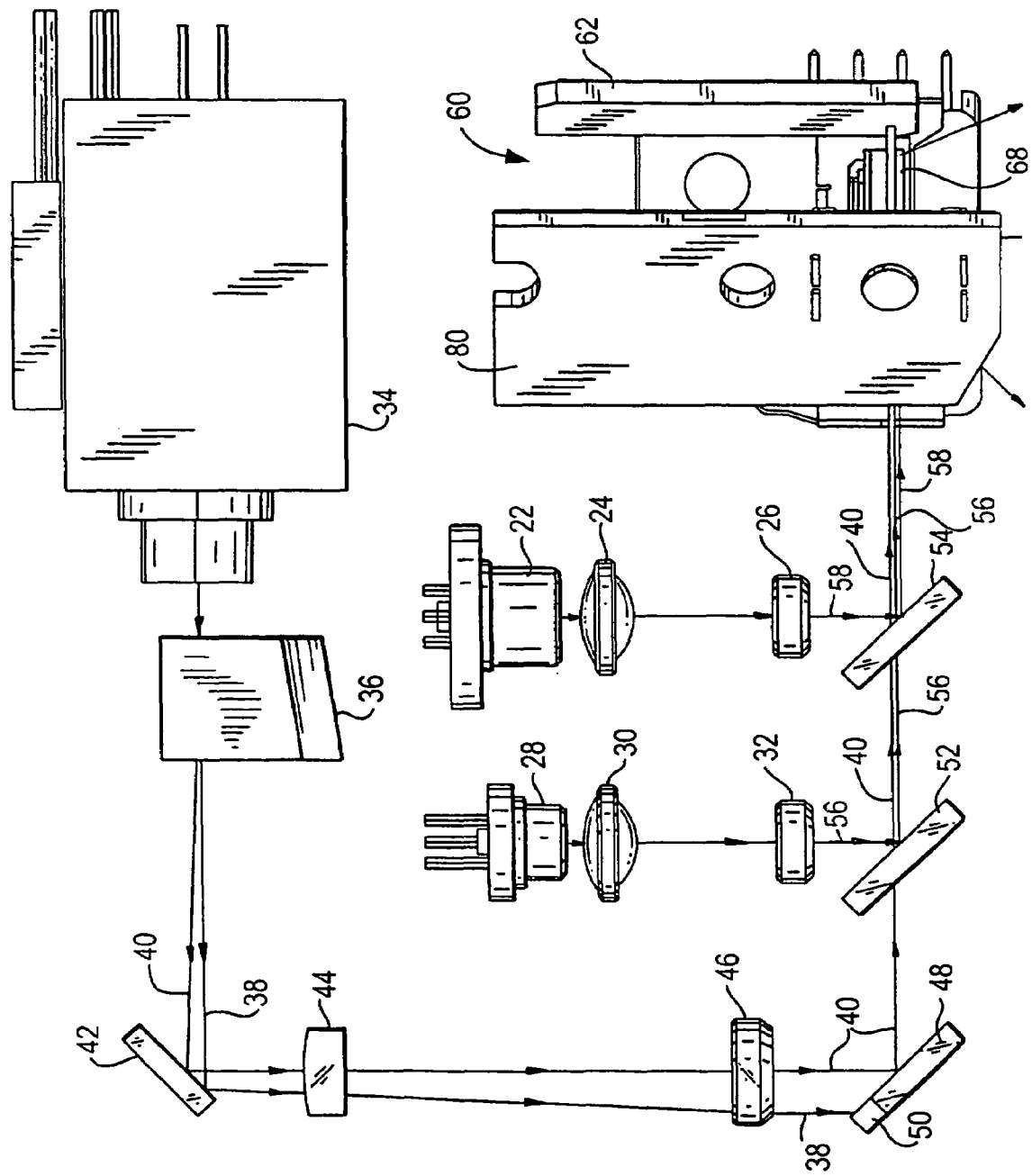
FIG. 3 is a top plan view of the arrangement of FIG. 2.

Reference numeral 10 in FIG. 1 generally identifies a hand-held instrument, for example, a personal digital assistant, in which a light weight, compact, image projection arrangement 20, as shown in FIG. 2, is mounted and operative for projecting a two-dimensional color image on a projection surface at a variable distance from the instrument. By way of example, an image 18 is situated within a working range of distances relative to the instrument 10.

As shown in FIG. 1, the image 18 extends over an optical horizontal scan angle A extending along the horizontal direction, and over an optical vertical scan angle B extending along the vertical direction, of the image. As described below, the image is comprised of illuminated and non-illuminated pixels on a raster pattern of scan lines swept by a scanner in the arrangement 20.

The parallelepiped shape of the instrument 10 represents just one form factor of a housing in which the arrangement 20 may be implemented. The instrument can be shaped with many different form factors, such as a pen, a cellular telephone, a clamshell or a wristwatch.

In the preferred embodiment, the arrangement 20 measures about seventy cubic centimeters in volume. This compact, miniature size allows the arrangement 20 to be mounted in housings of many diverse shapes, large or small, portable or stationary, including some having an on-board display 12, a keypad 14, and a window 16 through which the image is projected.

Referring to FIGS. 2 and 3, the arrangement 20 includes a solid-state, preferably a semiconductor laser 22 which, when energized, emits a bright red laser beam at about 635-655 nanometers. Lens 24 is a bi-aspheric convex lens having a positive focal length and is operative for collecting virtually all the energy in the red beam and for producing a diffraction-limited beam. Lens 26 is a concave lens having a negative focal length. Lenses 24, 26 are held by non-illustrated respective lens holders apart on a support (not illustrated in FIG. 2 for clarity) inside the instrument 10. The lenses 24, 26 shape the red beam profile over the working distance.

Another solid-state, semiconductor laser 28 is mounted on the support and, when energized, emits a diffraction-limited blue laser beam at about 440 nanometers. Another bi-aspheric convex lens 30 and a concave lens 32 are employed to shape the blue beam profile in a manner analogous to lenses 24, 26.

A green laser beam having a wavelength on the order of 532 nanometers is generated not by a semiconductor laser, but instead by a green module 34 having an infrared diode-pumped, Nd-doped, YAG crystal solid-state (DPSS) laser whose output beam at 1064 nanometers. A non-linear frequency doubling crystal is included in the infrared laser cavity between two laser mirrors. Since the infrared laser power inside the cavity is much larger than the power coupled outside the cavity, the frequency doubler is more efficient in generating the double frequency green light inside the cavity. The output mirror of the laser is reflective to the 1064 nm infrared radiation, and transmissive to the doubled 532 nm green laser beam. Since the correct operation of the solid-state laser and frequency doubler requires precise temperature control, a semiconductor device relying on the Peltier effect is used to control the temperature of the green laser module. The thermo-electric cooler can either heat or cool the device depending on the polarity of the applied current. A thermistor is part of the green laser module in order to monitor its temperature. The readout from the thermistor is fed to a controller, which adjusts the control current to the thermoelectric cooler accordingly.

In order to produce an image of high resolution, the lasers are modulated in operation at frequencies on the order of 100 MHz. The red and blue semiconductor lasers 22, 28 can be pulsed directly via the applied drive currents at such high modulation frequencies, but the currently available green solid-state (DPSS) lasers cannot. As a result, the green laser beam exiting the green module 34 is modulated with an external acousto-optical modulator (AOM) 36. A radio frequency (RF) signal of variable amplitude and derived from the incoming video signal is applied to a piezoelectric transducer operative to propagate an acoustic traveling wave inside a crystal in the AOM. The AOM is optimally aligned with the incident green beam at a positive Bragg angle (22 milliradians) and generates a modulated non-diffracted green beam 38 as a zero-order beam and a modulated diffracted green beam 40 as a positive first-order beam. The AOM could also be aligned at a negative Bragg angle, in which case, the modulated diffracted green beam is a negative first-order beam The non-diffracted zero-order green beam is collinear with the incident green beam and, hence, would be easier to align with the optical components described below. However, the modulated diffracted green beam is employed because the modulated diffracted green beam can be completely turned off, thereby enhancing the contrast and the extinction ratio between the illuminated and the non-illuminated pixels. The modulated non-diffracted green beam cannot be completely turned off.

The beams 38, 40 diverge from each other at twice the Bragg angle and are routed along a long, folded path having a folding mirror 42. Alternatively, the AOM can be used internally of the green laser module to pulse the green laser beam. Other possible ways to modulate the green laser beam include electro-absorption modulation, or a Mach-Zender interferometer. The beams 38, 40 are routed through positive and negative lenses 44, 46. As shown in FIG. 2, only the diffracted green beam 40 is allowed to impinge upon, and reflect from, the folding mirror 48. The non-diffracted beam 38 is absorbed by an absorber 50, preferably mounted on the mirror 48. The non-diffracted beam 38 need not be useless, but can usefully be employed as part of a safety circuit as described below in FIG. 10.

The arrangement includes a pair of dichroic filters 52, 54 arranged to make the diffracted green beam, the blue beam and the red beam as collinear as possible before reaching a scanning assembly 60. Filter 52 allows the diffracted green beam 40 to pass therethrough, but the blue beam 56 from the blue laser 28 is reflected by the interference effect. Filter 54 allows the diffracted green beam 40 and the blue beam 56 to pass therethrough, but the red beam 58 from the red laser 22 is reflected by the interference effect.

Figure 4:
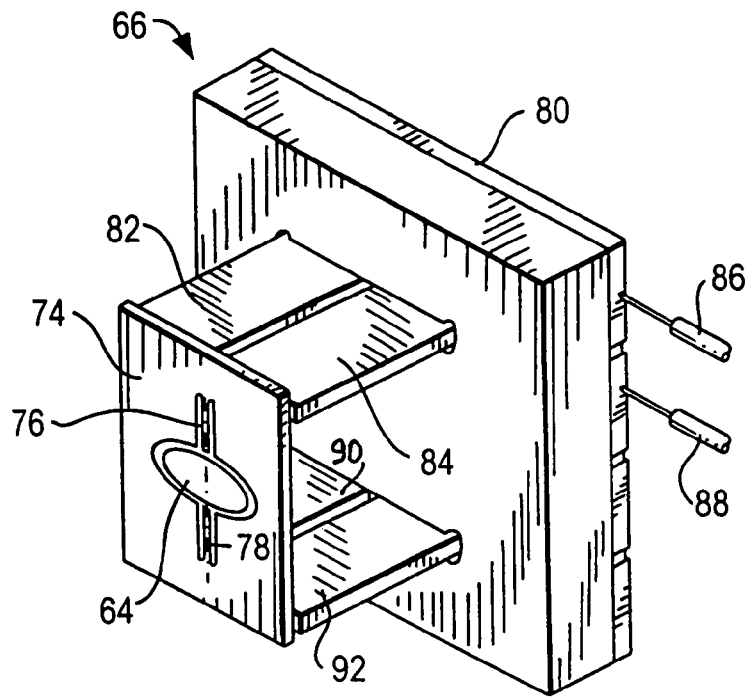
FIG. 4 is a perspective front view of an inertial drive for use in the arrangement of FIG. 2.
Figure 5:
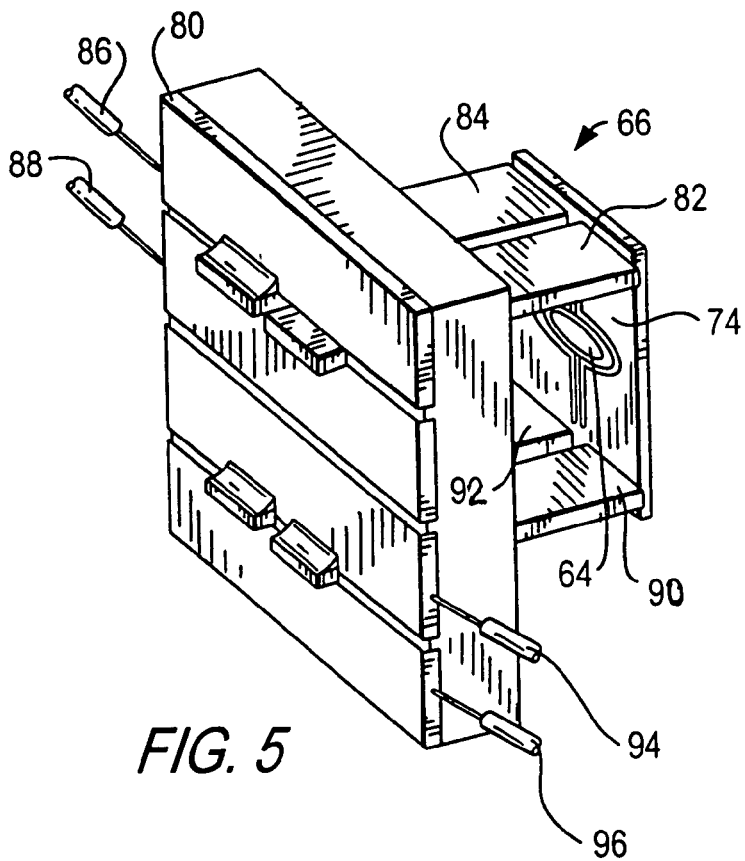
FIG. 5 is a perspective rear view of the inertial drive of FIG. 4.

The nearly collinear beams 40, 56, 58 are directed to, and reflected off, a stationary fold mirror 62. The scanning assembly 60 includes a first scan mirror 64 oscillatable by an inertial drive 66 (shown in isolation in FIGS. 4-5) at a first scan rate to sweep the laser beams reflected off the fold mirror 62 over the first horizontal scan angle A, and a second scan mirror 68 oscillatable by an electromagnetic drive 70 at a second scan rate to sweep the laser beams reflected off the first scan mirror 64 over the second vertical scan angle B. In a variant construction, the scan mirrors 64, 68 can be replaced by a single two-axis mirror.

The inertial drive 66 is a high-speed, low electrical power-consuming component. Details of the inertial drive can be found in U.S. patent application Ser. No. 10/387,878, filed Mar. 13, 2003, assigned to the same assignee as the instant application, and incorporated herein by reference thereto. The use of the inertial drive reduces power consumption of the scanning assembly 60 to less than one watt and, in the case of projecting a color image, as described below, to less than ten watts.

The drive 66 includes a movable frame 74 for supporting the scan mirror 64 by means of a hinge that includes a pair of collinear hinge portions 76, 78 extending along a hinge axis and connected between opposite regions of the scan mirror 64 and opposite regions of the frame. The frame 74 need not surround the scan mirror 64, as shown.

The frame, hinge portions and scan mirror are fabricated of an integral, generally planar, silicon substrate, which is approximately 150 microns thick. The silicon is etched to form omega-shaped slots having upper parallel slot sections, lower parallel slot sections, and U-shaped central slot sections. The scan mirror 64 preferably has an oval shape and is free to move in the slot sections. In the preferred embodiment, the dimensions along the axes of the oval-shaped scan mirror measure 749 microns×1600 microns. Each hinge portion measures 27 microns in width and 1130 microns in length. The frame has a rectangular shape measuring 3100 microns in width and 4600 microns in length.

The inertial drive is mounted on a generally planar, printed circuit board 80 and is operative for directly moving the frame and, by inertia, for indirectly oscillating the scan mirror 64 about the hinge axis. One embodiment of the inertial drive includes a pair of piezoelectric transducers 82, 84 extending perpendicularly of the board 80 and into contact with spaced apart portions of the frame 74 at either side of hinge portion 76. An adhesive may be used to insure a permanent contact between one end of each transducer and each frame portion. The opposite end of each transducer projects out of the rear of the board 80 and is electrically connected by wires 86, 88 to a periodic alternating voltage source (not shown).

In use, the periodic signal applies a periodic drive voltage to each transducer and causes the respective transducer to alternatingly extend and contract in length. When transducer 82 extends, transducer 84 contracts, and vice versa, thereby simultaneously pushing and pulling the spaced apart frame portions and causing the frame to twist about the hinge axis. The drive voltage has a frequency corresponding to the resonant frequency of the scan mirror. The scan mirror is moved from its initial rest position until it also oscillates about the hinge axis at the resonant frequency. In a preferred embodiment, the frame and the scan mirror are about 150 microns thick, and the scan mirror has a high Q factor. A movement on the order of 1 micron by each transducer can cause oscillation of the scan mirror at scan angles in excess of 15 degrees.

Another pair of piezoelectric transducers 90, 92 extends perpendicularly of the board 80 and into permanent contact with spaced apart portions of the frame 74 at either side of hinge portion 78. Transducers 90, 92 serve as feedback devices to monitor the oscillating movement of the frame and to generate and conduct electrical feedback control signals along wires 94, 96 to a feedback control circuit. Another feedback device is described below in connection with FIGS. 11-12.

Although light can reflect off an outer surface of the scan mirror, it is desirable to coat the surface of the mirror 64 with a specular coating made of gold, silver, aluminum, or a specially designed highly reflective dielectric coating.

The electromagnetic drive 70 includes a permanent magnet jointly mounted on and behind the second scan mirror 68, and an electromagnetic coil 72 operative for generating a periodic magnetic field in response to receiving a periodic drive signal. The coil 72 is adjacent the magnet so that the periodic field magnetically interacts with the permanent field of the magnet and causes the magnet and, in turn, the second scan mirror 68 to oscillate.

The inertial drive 66 oscillates the scan mirror 64 at a high speed at a scan rate preferably greater than 5 kHz and, more particularly, on the order of 18 kHz or more. This high scan rate is at an inaudible frequency, thereby minimizing noise and vibration. The electromagnetic drive 70 oscillates the scan mirror 68 at a slower scan rate on the order of 40 Hz which is fast enough to allow the image to persist on a human eye retina without excessive flicker.

The faster mirror 64 sweeps a generally horizontal scan line, and the slower mirror 68 sweeps the generally horizontal scan line vertically, thereby creating a raster pattern which is a grid or sequence of roughly parallel scan lines from which the image is constructed. Each scan line has a number of pixels. The image resolution is preferably XGA quality of 1024×768 pixels. Over a limited working range, a high-definition television standard, denoted 720p, 1270×720 pixels, can be obtained. In some applications, a one-half VGA quality of 320×480 pixels, or one-fourth VGA quality of 320×240 pixels, is sufficient. At minimum, a resolution of 160×160 pixels is desired.

The roles of the mirrors 64, 68 could be reversed so that mirror 68 is the faster, and mirror 64 is the slower. Mirror 64 can also be designed to sweep the vertical scan line, in which event, mirror 68 would sweep the horizontal scan line. Also, the inertial drive can be used to drive the mirror 68. Indeed, either mirror can be driven by an electromechanical, electrical, mechanical, electrostatic, magnetic, or electromagnetic drive.

The slow-mirror is operated in a constant velocity sweep-mode during which time the image is displayed. During the mirror's return, the mirror is swept back into the initial position at its natural frequency, which is significantly higher. During the mirror's return trip, the lasers can be powered down in order to reduce the power consumption of the device.

Figure 6:
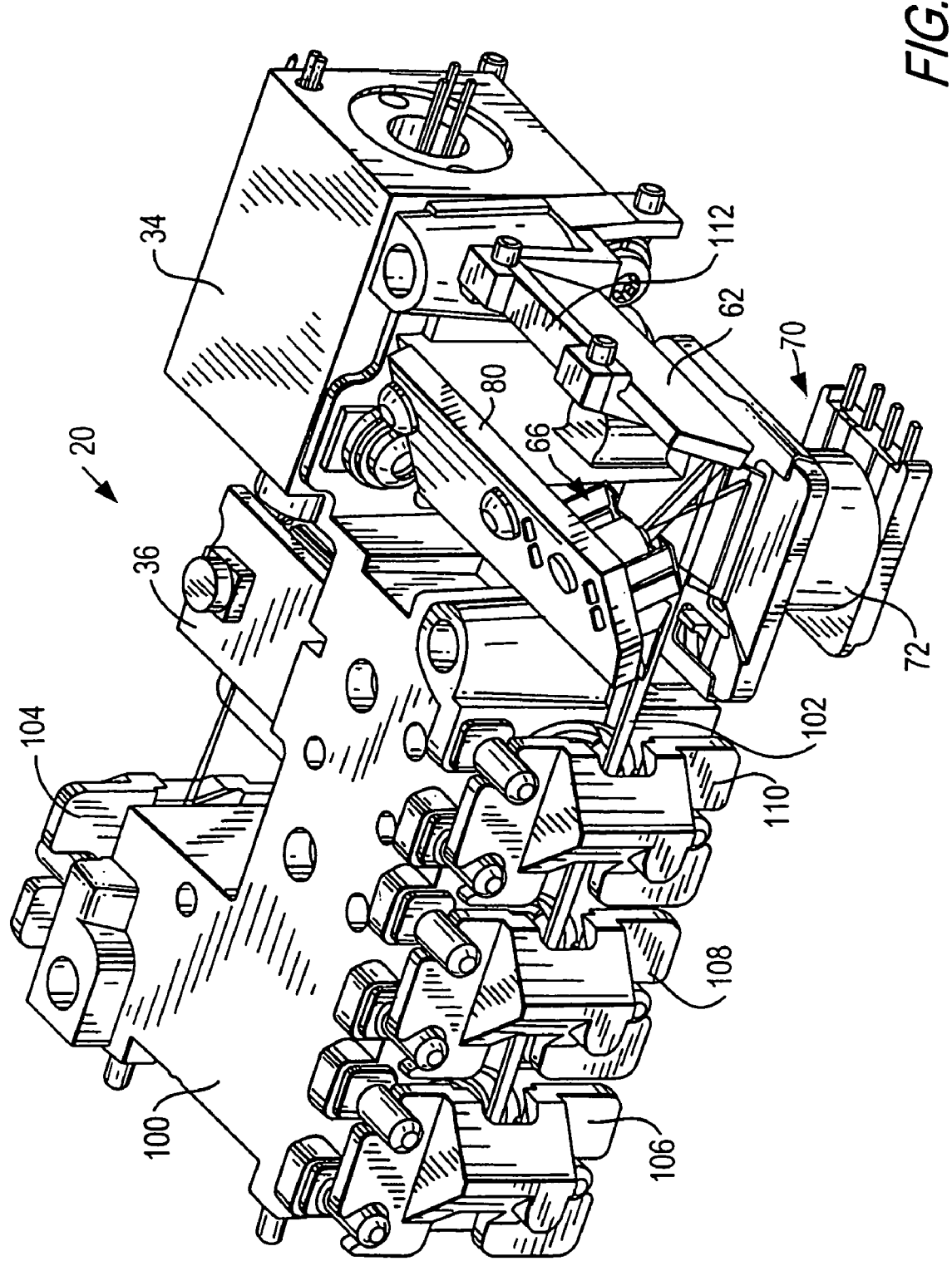
FIG. 6 is a perspective view of a practical implementation of the arrangement of FIG. 2.

FIG. 6 is a practical implementation of the arrangement 20 in the same perspective as that of FIG. 2. The aforementioned components are mounted on a support, which includes a top cover 100 and a support plate 102. Holders 104, 106, 108, 110, 112 respectively hold folding mirrors 42, 48, filters 52, 54 and fold mirror 62 in mutual alignment. Each holder has a plurality of positioning slots for receiving positioning posts stationarily mounted on the support. Thus, the mirrors and filters are correctly positioned. As shown, there are three posts, thereby permitting two angular adjustments and one lateral adjustment. Each holder can be glued in its final position.

The image is constructed by selective illumination of the pixels in one or more of the scan lines. As described below in greater detail with reference to FIG. 7, a controller 114 causes selected pixels in the raster pattern to be illuminated, and rendered visible, by the three laser beams. For example, red, blue and green power controllers 116, 118, 120 respectively conduct electrical currents to the red, blue and green lasers 22, 28, 34 to energize the latter to emit respective light beams at each selected pixel, and do not conduct electrical currents to the red, blue and green lasers to deenergize the latter to non-illuminate the other non-selected pixels. The resulting pattern of illuminated and non-illuminated pixels comprises the image, which can be any display of human- or machine-readable information or graphic.

Referring to FIG. 1, the raster pattern is shown in an enlarged view. Starting at an end point, the laser beams are swept by the inertial drive along the generally horizontal direction at the horizontal scan rate to an opposite end point to form a scan line. Thereupon, the laser beams are swept by the electromagnetic drive 70 along the vertical direction at the vertical scan rate to another end point to form a second scan line. The formation of successive scan lines proceeds in the same manner.

The image is created in the raster pattern by energizing or pulsing the lasers on and off at selected times under control of the microprocessor 114 or control circuit by operation of the power controllers 116, 118, 120. The lasers produce visible light and are turned on only when a pixel in the desired image is desired to be seen. The color of each pixel is determined by one or more of the colors of the beams. Any color in the visible light spectrum can be formed by the selective superimposition of one or more of the red, blue, and green lasers. The raster pattern is a grid made of multiple pixels on each line, and of multiple lines. The image is a bit-map of selected pixels. Every letter or number, any graphical design or logo, and even machine-readable bar code symbols, can be formed as a bit-mapped image.

Figure 7:
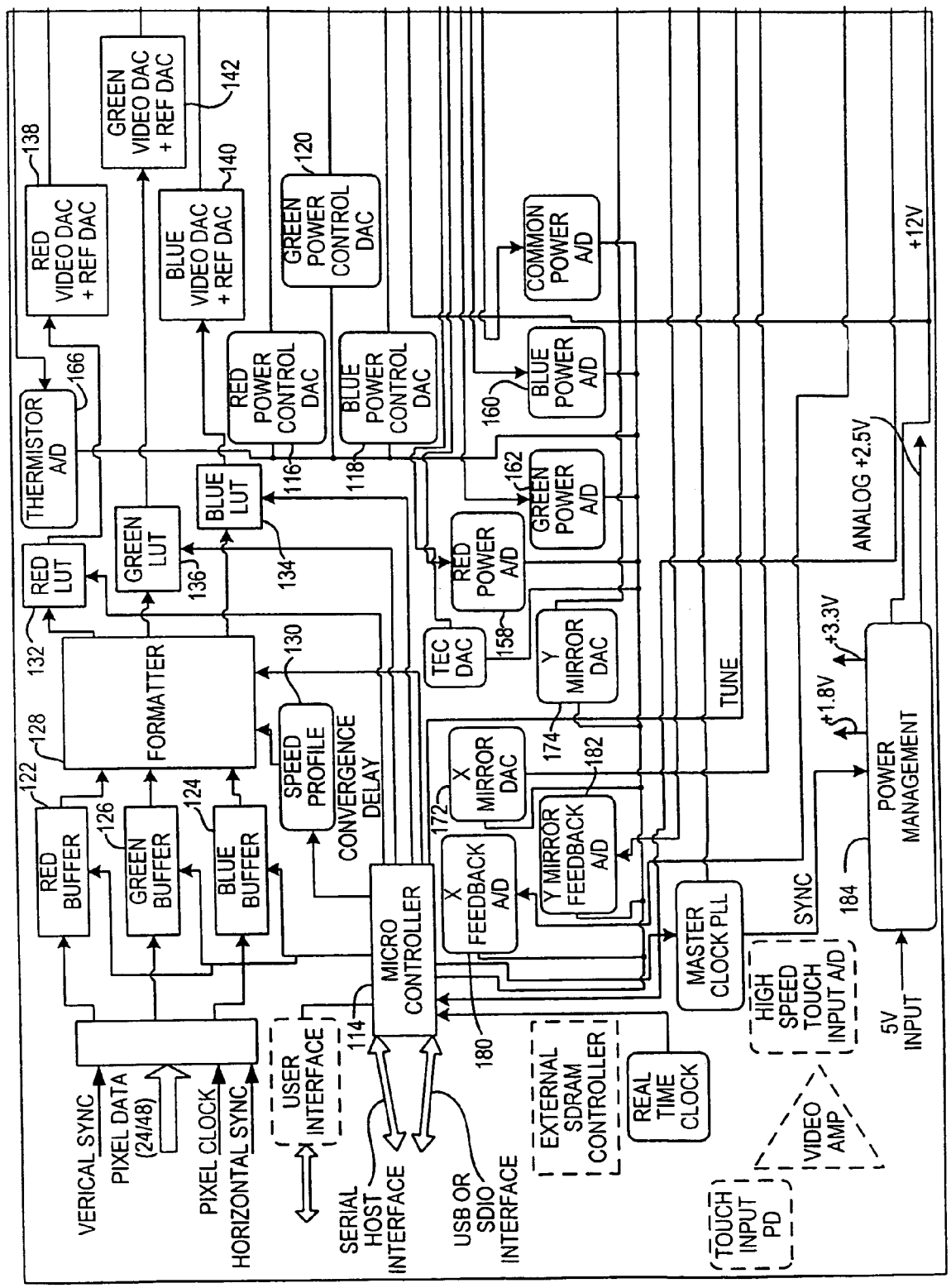
FIG. 7 is an electrical schematic block diagram depicting operation of the arrangement of FIG. 2.

As shown in FIG. 7, an incoming video signal having vertical and horizontal synchronization data, as well as pixel and clock data, is sent to red, blue and green buffers 122, 124, 126 under control of the microprocessor 114. The storage of one full VGA frame requires many kilobytes, and it would be desirable to have enough memory in the buffers for two full frames to enable one frame to be written, while another frame is being processed and projected. The buffered data is sent to a formatter 128 under control of a speed profiler 130 and to red, blue and green look up tables (LUTs) 132, 134, 136 to correct inherent internal distortions caused by scanning, as well as geometrical distortions caused by the angle of the display of the projected image. The resulting red, blue and green digital signals are converted to red, blue and green analog signals by digital to analog converters (DACs) 138, 140, 142. The red and blue analog signals are fed to red and blue laser drivers (LDs) 144, 146 which are also connected to the red and blue power controllers 116, 118. The green analog signal is fed to an acousto-optical module (AOM) radio frequency (RF) driver 150 and, in turn, to the green laser 34 which is also connected to a green LD 148 and to the green power controller 120.

Feedback controls are also shown in FIG. 7, including red, blue and green photodiode amplifiers 152, 154, 156 connected to red, blue and green analog-to-digital (A/D) converters 158, 160, 162 and, in turn, to the microprocessor 114. Heat is monitored by a thermistor amplifier 164 connected to an A/D converter 166 and, in turn, to the microprocessor.

The scan mirrors 64, 68 are driven by drivers 168, 170 which are fed analog drive signals from DACs 172, 174 which are, in turn, connected to the microprocessor. Feedback amplifiers 176, 178 detect the position of the scan mirrors 64, 68, and are connected to feedback A/Ds 180, 182 and, in turn, to the microprocessor.

A power management circuit 184 is operative to minimize power while allowing fast on-times, preferably by keeping the green laser on all the time, and by keeping the current of the red and blue lasers just below the lasing threshold.

Figure 8:
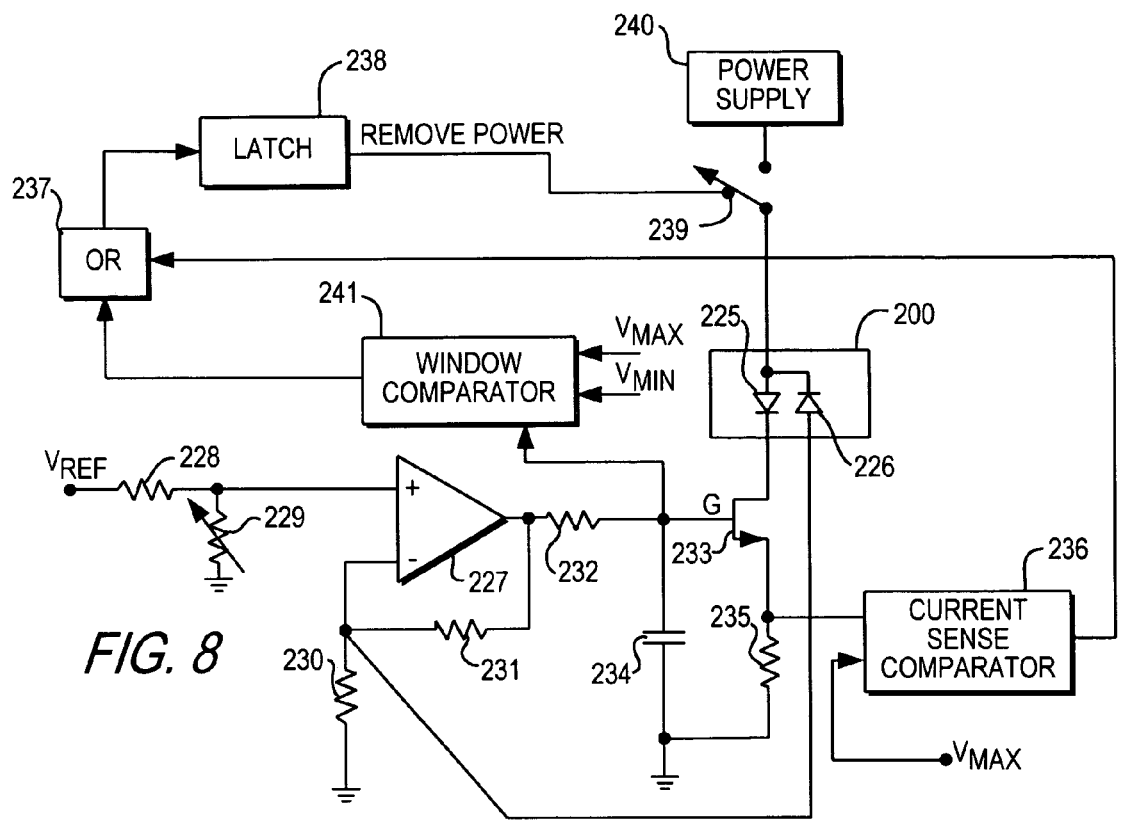
FIG. 8 is an electrical schematic view of a safety circuit used with any of the lasers in the arrangement of FIG. 2.

As shown in FIG. 8 for a representative laser 200 (which can be any of lasers 22, 28, 34), the laser 200 includes a laser diode 225 and an internal monitor photodiode 226 operative for monitoring the output power of the diode 225. The internal photodiode 226 is part of a feedback circuit operative for maintaining the laser output power constant. The feedback circuit includes a comparator 227 having a reference voltage applied to a positive input of the comparator through a voltage divider comprised of resistors 228, 229. The internal photodiode 226 is connected to a negative input of the comparator via a resistive network including resistors 230, 231. The output of the comparator 227 is conducted through a resistor 232 and capacitor 234 to a gate G of a field effect transistor (FET) 233. The drain output of the FET 233 is connected to the laser diode 225. The source output of the device 233 is connected to ground through a current sense resistor 235.

As described so far, the circuit of FIG. 8 is conventional in that the internal photodiode 226 detects changes in output power of the laser beam emitted by laser diode 225 and sends a feedback signal to the comparator 227 for driving the FET 233 to allow more or less current to pass through the current sense resistor 235 and, in turn, through the laser diode 225. The greater this current, the greater the laser output power, and vice versa.

In accordance with one safety circuit of this invention, a current sense comparator 236 has one input connected to the current sense resistor 235 to monitor the current flowing therethrough, and another input connected to a reference voltage that corresponds to the maximum current allowable through the resistor 235. The output of the comparator 236 is connected to an OR gate 237 which, in turn, is connected to a latch 238 and a switch 239, which is connected between a power supply 240 and the laser diode 225. If the comparator 236 senses that the current passing through the resistor 235 exceeds a maximum preestablished value, then an output control signal is conducted to the gate 237 and, in turn, to the latch 238 for opening the switch 239 to remove the power source 240 from energizing the laser diode 225.

In further accordance with FIG. 8, a window comparator 241 is connected to the resistor 232 and monitors the voltage being applied to the gate G of the FET 233. A maximum gate voltage and a minimum gate voltage are also applied to the window comparator 241. The comparator 241 is, in turn, connected to the OR gate 237. If the comparator 241 senses that the gate voltage being applied to the gate G is greater than the preestablished maximum gate voltage, or is less than the preestablished minimum gate voltage, then a signal is sent to the OR gate 237 to operate the latch 238 and open the switch 239, thereby deenergizing the laser diode. Thus, power is removed from the laser diode 225 in the event of malfunction or failure of the internal photodiode 226, the FET 233, the comparator 227, the laser diode 225, or any circuit connection.

Figure 9:
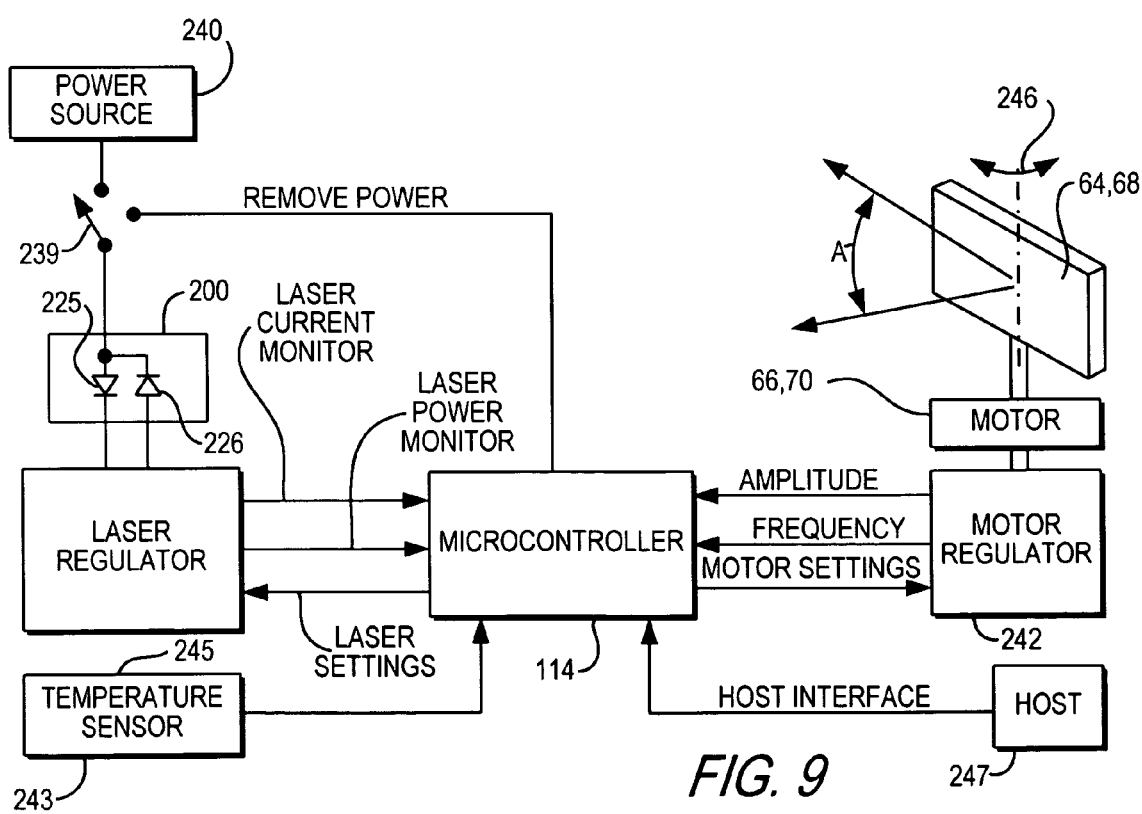
FIG. 9 is an electrical schematic view of another safety circuit used with any of the lasers in the arrangement of FIG. 2.

In accordance with another safety circuit of this invention, as shown in the arrangement of FIG. 9, the laser 200 is connected to the power source 240 by the switch 239 under control of the microcontroller 114. A temperature sensor 243 is connected to the microcontroller 114 for monitoring the ambient temperature of the arrangement, preferably in the vicinity of the laser 200. If the monitored temperature exceeds a preset value, the microcontroller 114 opens the switch 239 to protect the laser 200. A laser regulator 245 is connected to the laser source 200 and enables the microcontroller 114 to monitor the laser current and/or the laser output power and, if those values or other laser settings are outside preestablished values for these parameters, then the microcontroller 114 also opens the switch 239 to protect the laser source.

The aforementioned motor drive 66, 70 for oscillating the scan mirrors 64, 68 in alternate circumferential directions denoted by the double-headed arrow 246 is under the control of a motor regulator 242 and the microcontroller 114. The microcontroller itself monitors the amplitude of scan angle A and the frequency of oscillation at which the scan mirrors 64, 68 is oscillated. If these values or other motor settings are outside preestablished values for these parameters, then the microcontroller 114 opens the switch 239. The microcontroller 114 can store the preestablished values, or it can communicate with a remote host 247 to retrieve the preestablished values, or updated values.

Figure 10:
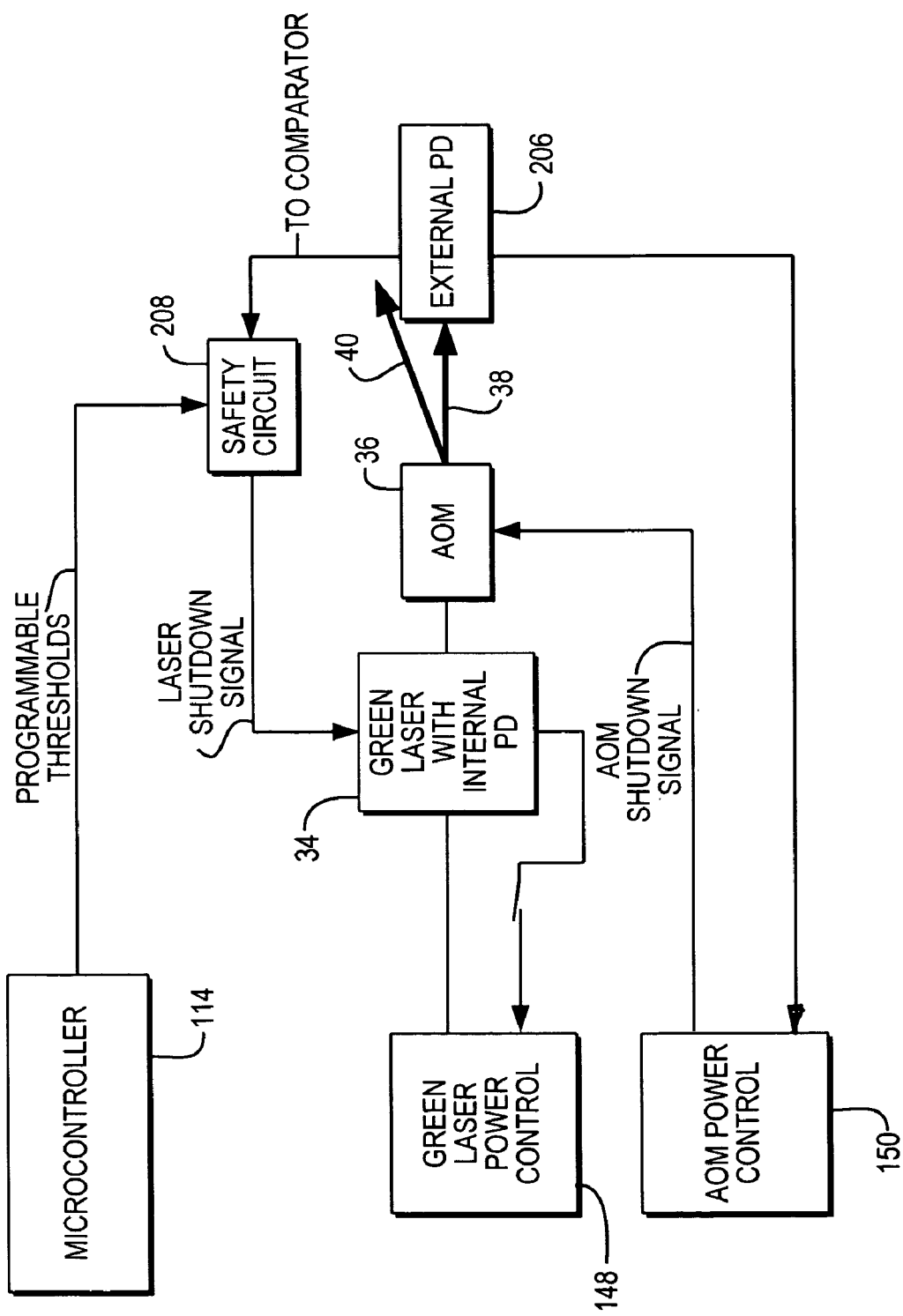
FIG. 10 is an electrical schematic view of another safety circuit used with the green laser in the arrangement of FIG. 2.

Turning now to FIG. 10, the green module 34 has an internal photodiode normally operative for monitoring the green laser output power. As described above, the internal photodiode is part of a feedback circuit connected to the green laser drive 148 for maintaining the green laser output power constant during operation. For additional safety, it is desired to know the magnitude of the output power of the green laser. An external photodiode 206 is provided for detecting an output power of the modulated non-diffracted beam 38. The detected output power can be used to deenergize the AOM 36 via the AOM drive 150 that generates an AOM shutdown signal. In addition, the detected output power can be sent to a comparator and a safety circuit 208 which are operative for generating a laser shutdown signal for deenergizing the green laser module 34 when the output power of the modulated non-diffracted beam 38 is not within a preestablished range of output powers set as programmed threshold values by the microcontroller 114.

The external photodiode 206 is preferably mounted in a mounting hole on the support 100, 102 and collects the modulated non-diffracted beam 38 scattered by an internal wall of the support. A light guide may be used to guide the light to the external photodiode 206. The output power of the modulated non-diffracted beam 38 is proportional to the total output power of the incident green beam. The external photodiode 206 can also be used to collect the modulated red and blue beams scattered by the internal wall of the support and to cooperate with the safety circuit to shut off the red and blue lasers in the event of detection of a malfunction.

Figure 11:
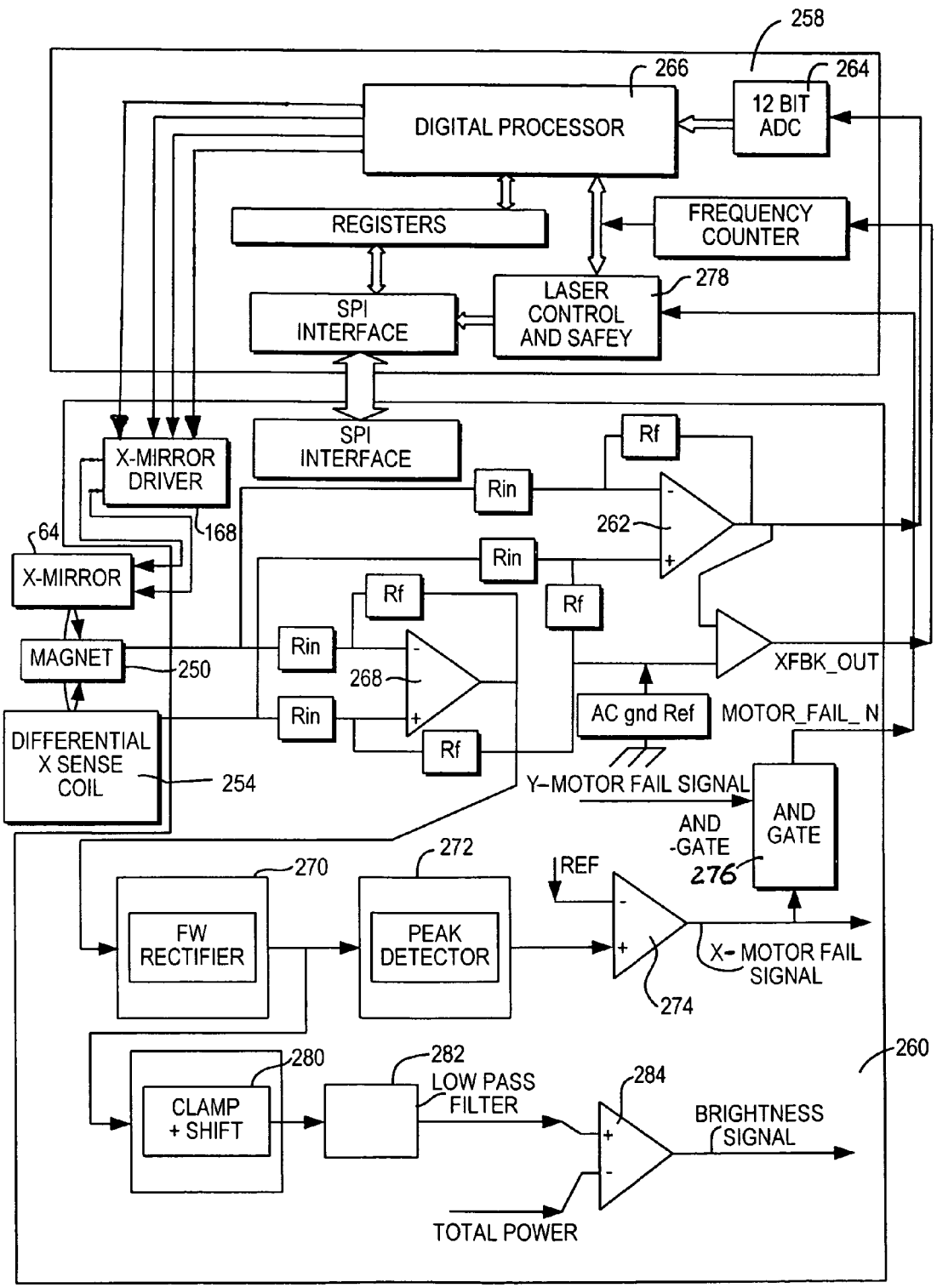
FIG. 11 is an electrical schematic block diagram of a safety circuit for one of the scan mirrors of the arrangement of FIG. 2.
Figure 12:
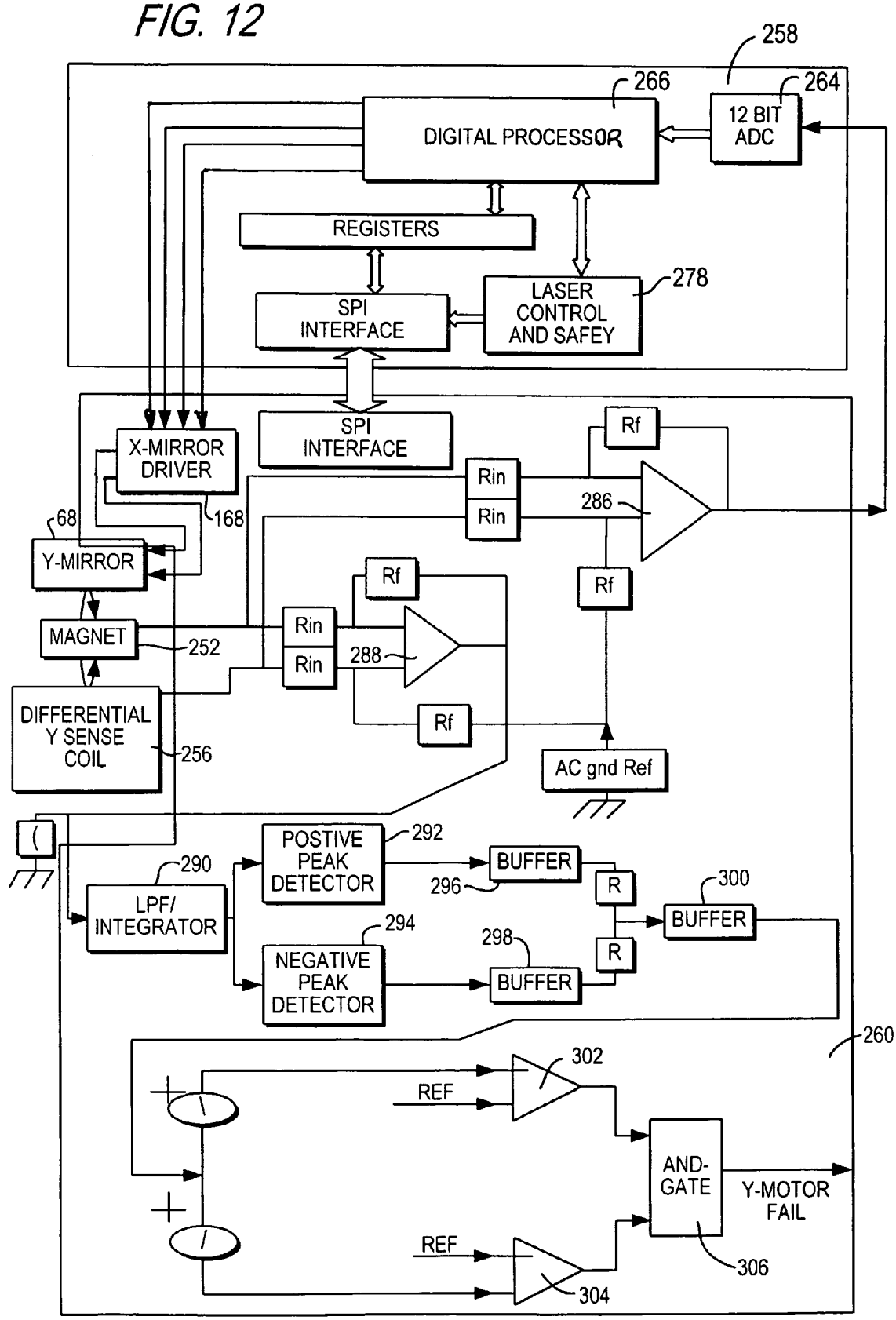
FIG. 12 is an electrical schematic block diagram of a safety circuit for the other of the scan mirrors of the arrangement of FIG. 2.

FIG. 11 depicts a safety circuit for the scan mirror 64 (also known as the X-mirror) driven by the X-mirror driver 168, and FIG. 12 depicts a safety circuit for the scan mirror 68 (also known as the Y-mirror) driven by the Y-mirror driver 170. Respective permanent magnets 250, 252 are jointly mounted on and behind the scan mirrors 64, 68 and respective electromagnetic sense coils 254, 256 are operative for generating respective periodic magnetic fields in response to oscillation of the permanent magnets and the scan mirrors 64, 68. Each sense coil is adjacent its associated magnet, and each periodic field generates a feedback control signal which has the same scan frequency as the respective oscillating scan mirrors 64, 68, and which also has an amplitude indicative of the amplitude of the respective oscillating scan mirrors 64, 68. In the preferred embodiment, the safety circuits for FIGS. 11-12 are implemented in a digital ASIC 258 and a part analog and part digital ASIC 260.

In FIG. 11, a first branch of the safety circuit includes a comparator 262 whose output is conducted to an analog-to-digital converter 264 and a digital processor 266 whose output can deenergize the X-mirror driver 168 upon detection of a malfunction. A second branch of the safety circuit includes a comparator 268 whose output is conducted to a full wave rectifier 270, a peak detector 272, and one input of another comparator 274 whose other input is connected to a reference value. The output of the comparator 274 can be fed directly to the X-mirror driver 168, or to one input of an AND gate 276 whose other input carries a control signal derived from FIG. 12 that indicates that the Y-drive has malfunctioned. When both the X-drive and the Y-drive have malfunctioned, then the output of the AND gate 276 is conducted to a laser control safety circuit 278 whose output is conducted to the digital processor 266 and used to shut down the drivers 168, 170. The two branches of the safety circuit of FIG. 11 ensure a high degree of safety due to redundancy.

FIG. 11 also shows that the output from the rectifier 270 is conducted to a clamp-and-shift circuit 280, a low pass filter 282, and one input of a comparator 284 whose other input is set to a reference value indicative of the total output power of all the lasers. This reference value is proportional to the speed of the X-mirror 64. The output of the comparator 284 indicates that the maximum output power has been exceeded, and is conducted to the digital processor 266 and used to shut down the drivers 168, 170.

In FIG. 12, a first branch of the safety circuit includes a comparator 286 whose output is conducted to the analog-to-digital converter 264 and the digital processor 266 whose output can deenergize the Y-mirror driver 170 upon detection of a malfunction. A second branch of the safety circuit includes a comparator 288 whose output is conducted to a low pass filter/integrator 290, a positive peak detector 292, a negative peak detector 294, a pair of branch buffers 296, 298, and a main buffer 300. The output of the main buffer is split and conducted to one input of respective comparators 302, 304 whose other input is connected to a reference value. The output of the comparators 302, 304 is fed to an AND-gate 306 whose output can be fed directly to the Y-mirror driver 170, or to the other input of the AND gate 276 (see FIG. 11). The two branches of the safety circuit of FIG. 12 further ensure a high degree of safety due to redundancy.

It will be understood that each of the elements described above, or two or more together, also may find a useful application in other types of constructions differing from the types described above.

While the invention has been illustrated and described as embodied in an arrangement for and a method of projecting an image with safety circuitry, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

We claim:

1. An image projection arrangement for projecting an image, comprising:
   an energizable laser assembly including a plurality of lasers for generating a plurality of laser beams of different wavelengths each laser having an output power when energized;
   an energizable scanner including a pair of oscillatable scan mirrors for sweeping the laser beams at respective scan rates as a pattern of scan lines at a distance from the laser assembly, each scan line having a number of pixels;
   a controller operatively connected to the laser assembly and the scanner, for causing selected pixels along the scan lines to be illuminated, and rendered visible, by the laser beams to produce the image; and
   a safety circuit for detecting a malfunction of at least one of the laser assembly and the scanner, and for deenergizing at least one of the lasers when a total output power of all of the lasers exceeds a threshold proportional to one of the scan rates of one of the scan mirrors.

2. The image projection arrangement of claim 1, and an optical assembly for focusing and nearly collinearly arranging the laser beams to form a composite beam which is directed to the scanner.

3. The image projection arrangement of claim 2, wherein the lasers include red and blue, semiconductor lasers for respectively generating red and blue laser beams.

4. The image projection arrangement of claim 3, wherein the lasers include a diode-pumped YAG laser and an optical frequency doubler for producing a green laser beam.

5. The image projection arrangement of claim 1, wherein the safety circuit includes an internal photodiode within each laser for monitoring the output power of each laser.

6. The image projection arrangement of claim 1, wherein the safety circuit includes an external photodiode outside of each laser for monitoring the output power of each laser.

7. The image projection arrangement of claim 1, wherein the safety circuit is operative for deenergizing the at least one of the lasers when the output power of the at least one laser is not within a preestablished range of output powers.

8. The image projection arrangement of claim 1, wherein a first of the oscillatable scan mirrors is operative for sweeping the laser beams along a first direction over a first scan angle, and a second of the oscillatable scan mirrors is operative for sweeping the laser beams along a second direction substantially perpendicular to the first direction, and over a second scan angle different from the first scan angle.

9. The image projection arrangement of claim 8, wherein the safety circuit is operative for deenergizing at least one of the lasers when the scan angle of at least one of the scan mirrors is not within a preestablished range of scan angles.

10. The image projection arrangement of claim 1, wherein the safety circuit has redundant safety branches, each safety branch being operative for detecting the malfunction of the at least one of the laser assembly and the scanner, and for deenergizing the at least one of the lasers upon detection of the malfunction.

11. An image projection arrangement for projecting a two-dimensional, color image on a projection surface, comprising:
   a support;
   a laser assembly including red, blue and green, energizable lasers on the support, for respectively emitting a plurality of red, blue and green laser beams, each laser having respective output powers when energized;
   an optical assembly on the support, for optically focusing and collinearly arranging the red, blue and green beams to form a composite beam;
   an energizable scanner including a pair of oscillatable scan mirrors on the support, for sweeping the composite beam at respective scan rates in a pattern of scan lines at a distance from the support on the projection surface, each scan line having a number of pixels;
   a controller operatively connected to the laser assembly and the scanner, for causing selected pixels to be illuminated, and rendered visible, by the composite beam to produce the image, the controller being operative for selecting at least some of the laser beams to illuminate the selected pixels to produce the image with color; and
   a safety circuit for detecting a malfunction of at least one of the lasers and the scanner, and for deenergizing the at least one of the lasers when a total output power of all of the lasers exceeds a threshold proportional to one of the scan rates of one of the scan mirrors.

12. The image projection arrangement of claim 11, wherein the safety circuit includes an internal photodiode within each laser for monitoring the output power of each laser.

13. The image projection arrangement of claim 11, wherein the safety circuit includes an external photodiode outside of each laser for monitoring the output power of each laser.

14. The image projection arrangement of claim 11, wherein the safety circuit is operative for deenergizing the at least one of the lasers when the output power of the at least one laser is not within a preestablished range of output powers.

15. The image projection arrangement of claim 11, wherein a first of the oscillatable scan mirrors is operative for sweeping the composite beam along a first direction over a first scan angle, and a second of the oscillatable scan mirrors is operative for sweeping the composite beam along a second direction substantially perpendicular to the first direction, and over a second scan angle different from the first scan angle.

16. The image projection arrangement of claim 15, wherein the safety circuit is operative for deenergizing the at least one of the lasers when the scan angle of at least one scan minor is not within a preestablished range of scan angles.

17. The image projection arrangement of claim 11, wherein the safety circuit has redundant safety branches, each safety branch being operative for detecting the malfunction of the at least one of the lasers and the scanner, and for deenergizing the at least one of the lasers upon detection of the malfunction.

18. An image projection arrangement for projecting an image, comprising:
  energizable laser means for generating a plurality of laser beams of different wavelengths from a plurality of lasers each having an output power when energized;
  energizable scanner means including a pair of oscillatable scan mirrors for sweeping the laser beams at respective scan rates as a pattern of scan lines at a distance from the laser means, each scan line having a number of pixels;
  controller means operatively connected to the laser means and the scanner means, for causing selected pixels along the scan lines to be illuminated, and rendered visible, by the laser beams to produce the image; and
  safety means for detecting a malfunction of at least one of the laser means and the scanner means, and for deenergizing at least one of the lasers when a total output power of all of the lasers exceeds a threshold proportional to one of the scan rates of one of the scan mirrors.

19. An image projection module for projecting an image on a projection surface, comprising:
  a support;
  an energizable laser assembly on the support, for generating a plurality of laser beams of different wavelengths from a plurality of lasers each having an output power when energized;
  an energizable scanner including a pair of oscillatable scan minors on the support, for sweeping the laser beams at respective scan rates as a pattern of scan lines at a distance from the support on the projection surface, each scan line having a number of pixels;
  a controller operatively connected to the laser assembly and the scanner, for causing selected pixels along the scan lines to be illuminated, and rendered visible, by the laser beams to produce the image; and
  a safety circuit for detecting a malfunction of at least one of the laser assembly and the scanner, and for deenergizing at least one of the lasers when a total output power of all of the lasers exceeds a threshold proportional to one of the scan rates of one of the scan mirrors.

20. A method of projecting an image, comprising the steps of:
  generating a plurality of laser beams of different wavelengths from a plurality of lasers each having an output power;
  sweeping the laser beams by oscillating a pair of scan mirrors at respective scan rates as a pattern of scan lines, each scan line having a number of pixels;
  causing selected pixels along the scan lines to be illuminated, and rendered visible, by the laser beams to produce the image;
  detecting a malfunction in the performance of at least one of the generating and sweeping steps, and deenergizing at least one of the lasers when a total output power of all of the lasers exceeds a threshold proportional to one of the scan rates of one of the scan mirrors.

21. The image projection method of claim 20, wherein the detecting step is performed by an internal photodiode within each laser for monitoring the output power of each laser.

22. The image projection method of claim 20, wherein the detecting step is performed by an external photodiode outside of each laser for monitoring the output power of each laser.

23. The image projection method of claim 20, wherein the deenergizing step is performed by deenergizing the at least one of the lasers when the output power of the at least one laser is not within a preestablished range of output powers.

24. The image projection method of claim 20, wherein the scanning step is performed by sweeping the laser beams along a first direction over a first scan angle by a first of the scan mirrors, and by sweeping the laser beams along a second direction substantially perpendicular to the first direction over a second scan angle different from the first scan angle angle by a second of the scan mirrors.

25. The image projection method of claim 24, wherein the deenergizing step is performed by deenergizing at least one of the lasers when the scan angle of at least one of the scan mirrors is not within a preestablished range of scan angles.

26. The image projection method of claim 20, wherein the detecting and deenergizing steps are performed by redundant circuitry.

* * * * *